United States Patent
Di Grazia et al.

(10) Patent No.: US 12,222,426 B2
(45) Date of Patent: Feb. 11, 2025

(54) METHOD FOR DETECTING SPOOFING IN A GNSS (GLOBAL NAVIGATION SATELLITE SYSTEM) RECEIVER, CORRESPONDING RECEIVER APPARATUS METHOD AND COMPUTER PROGRAM PRODUCT

(71) Applicant: STMICROELECTRONICS S.r.l., Agrate Brianza (IT)

(72) Inventors: Domenico Di Grazia, Cesa (IT); Fabio Pisoni, Busto Garolfo (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 313 days.

(21) Appl. No.: 17/953,869

(22) Filed: Sep. 27, 2022

(65) Prior Publication Data
US 2023/0099213 A1    Mar. 30, 2023

(30) Foreign Application Priority Data
Sep. 30, 2021    (IT) .......................... 102021000025175

(51) Int. Cl.
*G01S 19/21*    (2010.01)
(52) U.S. Cl.
CPC .................................. *G01S 19/215* (2013.01)
(58) Field of Classification Search
CPC .................................................... G01S 19/215
(Continued)

(56) References Cited

U.S. PATENT DOCUMENTS 10,739,466 B2 * 8/2020 Grobert .................... H04K 3/90
11,709,274 B2 * 7/2023 Gum ..................... G01S 19/215
                                                        342/357.59
(Continued)

FOREIGN PATENT DOCUMENTS

CA       3109487 A1 *  8/2021  .......... G01S 19/215
CN     106873002 B  *  3/2018
(Continued)

OTHER PUBLICATIONS

Jovanovic et al., "Multi-test Detection and Protection Algorithm Against Spoofing Attacks on GNSS Receivers", 2014 IEEE/ION Position, Location and Navigation Symposium—PLANS 2014, IEEE, May 5, 2014, pp. 1258-1271.
(Continued)

*Primary Examiner* — Harry K Liu
(74) *Attorney, Agent, or Firm* — Seed IP Law Group LLP (57) ABSTRACT

A satellite tracking channel has a frequency loop tracking a carrier frequency of a satellite signal. A first indication of a spoofed signals is generated based on a determined satellite signal noise floor value associated with the satellite tracking channel and a tracking channel signal noise threshold associated with the satellite tracking channel. A second indication of a spoofed signal is generated based on a determining satellite tracking phase noise associated with the satellite tracking channel and a tracking channel phase noise threshold associated with the satellite tracking channel. Reception of a spoofed signal on the satellite tracking channel is detected based on the generated first indication of a spoofed signal and the generated second indication of the spoofed signal.

24 Claims, 4 Drawing Sheets

(58) Field of Classification Search
USPC .................................................. 342/357.59
See application file for complete search history.

(56) References Cited

U.S. PATENT DOCUMENTS

| | | |
|---|---|---|
| 2015/0234053 A1 | 8/2015 | Psiaki et al. |
| 2017/0227650 A1* | 8/2017 | Grobert .................... H04K 3/65 |
| 2017/0234979 A1 | 8/2017 | Mathews et al. |

FOREIGN PATENT DOCUMENTS

| | | | | |
|---|---|---|---|---|
| CN | 108226967 A | * | 6/2018 | ............. G01S 19/30 |
| CN | 114325769 A | * | 4/2022 | |
| CN | 114355392 A | * | 4/2022 | |

OTHER PUBLICATIONS

Blum et al., "New and Existing Signal Quality Monitoring Metrics Tested Against Simulations and Time Synchronized Signal Generator Attacks", GNSS 2020—Proceedings of the 33rd International Technical Meeting of the Satellite Division of the Institute of Navigation (ION GNSS+ 2020), Sep. 22-25, 2020, pp. 3835-3853.

* cited by examiner

METHOD FOR DETECTING SPOOFING IN A GNSS (GLOBAL NAVIGATION SATELLITE SYSTEM) RECEIVER, CORRESPONDING RECEIVER APPARATUS METHOD AND COMPUTER PROGRAM PRODUCT

BACKGROUND

Technical Field

Embodiments of the present disclosure relate to solutions concerning detection of a spoofed signal in a GNSS (Global Navigation Satellite System) receiver, and related receiver apparatus.

The present disclosure in particular refers to techniques for detecting a tracking channel affected by a spoofing signal in a GNSS Multi Frequency-Multi Constellation Receiver.

Description of the Related Art

Integrity is key feature in the transport contest and the increasing availability of low cost "Meaconing"/"Spoofing" systems is a critical issue.

A so called "spoofer" can intentionally lead a receiver to estimate a fake position and cause incorrect decisions.

Autonomous and assisted driving applications are raising the requirements for on-board GNSS receivers and to have a robust anti-spoofing system operating with such a receiver.

Meaconing, specifically, is the interception and rebroadcast of GNSS navigation signals. These signals are rebroadcast on the received carrier, typically, with power higher than the original signal, to confuse enemy navigation. Consequently, aircraft, UAV or ground stations are given inaccurate bearings. Such meaconing can be used also in transport context to give not accurate bearing to land vehicle, such as cars, with assisted and autonomous driving.

Anti-spoofing methods to contrast meaconing are known. For instance, a known solution envisages executing position identification using more constellations in an independent way and checking the consistency among them. It relies on the Hyp that Spoofing is not affecting all the tracked constellations/bandwidths.

Such solution acts only after the spoofer has taken the tracking channels and needs Multifrequency/parallel positioning.

Also, it can be used a Navigation Message Authentication usage, which is a Galileo PRS service.

The Galileo Public Regulated Service (PRS) is an encrypted navigation service for governmental authorized users. Signal Ephemerides are "encrypted," and a key management is employed between satellite and PRS receiver.

Of course, PRS Galileo tracking and usage is needed, so it cannot be applied to other systems.

Other methods to detect GPS spoofing use a multiple antenna array. Such a solution needs therefore additional hardware.

BRIEF SUMMARY

In an embodiment, a method comprises: determining a satellite signal noise floor value associated with a satellite tracking channel, the satellite tracking channel having a frequency loop tracking a carrier frequency of a satellite signal; comparing the determined satellite signal noise floor value with a tracking channel signal noise threshold associated with the satellite tracking channel; determining a satellite tracking phase noise associated with the satellite tracking channel; comparing the determined satellite tracking phase noise with a tracking channel phase noise threshold associated with the satellite tracking channel; detecting reception of a spoofed signal on the satellite tracking channel based on the comparing of the determined satellite signal noise floor value with the tracking channel signal noise threshold and the comparing of the determined satellite tracking phase noise with the tracking channel phase noise threshold; and responding to the comparing of the determined satellite signal noise floor value with the tracking channel signal noise threshold indicating the determined satellite signal noise floor value exceeds the tracking channel signal noise threshold and the comparing of the determined satellite tracking phase noise with the tracking channel phase noise threshold indicating the determined satellite tracking phase noise exceeds the tracking channel phase noise threshold by generating a signal indicating a spoofed signal has been detected on the satellite tracking channel.

In an embodiment, a device comprises: a memory; and signal processing circuitry coupled to the memory. The signal processing circuitry, in operation: implements a satellite tracking channel having a frequency loop tracking a carrier frequency of a satellite signal; determines a satellite signal noise floor value associated with the satellite tracking channel; generates a first indication of a spoofed signal based on the determined satellite signal noise floor value and a tracking channel signal noise threshold associated with the satellite tracking channel; determines a satellite tracking phase noise associated with the satellite tracking channel; generates a second indication of a spoofed signal based on the determined satellite tracking phase noise and a tracking channel phase noise threshold associated with the satellite tracking channel; and detects reception of a spoofed signal on the satellite tracking channel based on the generated first indication of a spoofed signal and the generated second indication of the spoofed signal.

In an embodiment, a system comprises: a host processor; and signal processing circuitry coupled to the host processor. The signal processing circuitry, in operation: implements a satellite tracking channel having a frequency loop tracking a carrier frequency of a satellite signal; determines a satellite signal noise floor value associated with the satellite tracking channel; generates a first indication of a spoofed signal based on the determined satellite signal noise floor value and a tracking channel signal noise threshold associated with the satellite tracking channel; determines a satellite tracking phase noise associated with the satellite tracking channel; generates a second indication of a spoofed signal based on the determined satellite tracking phase noise and a tracking channel phase noise threshold associated with the satellite tracking channel; and detects reception of a spoofed signal on the satellite tracking channel based on the generated first indication of a spoofed signal and the generated second indication of the spoofed signal.

In an embodiment, a non-transitory computer-readable medium's contents cause a signal processing system to perform a method, the method comprising: implementing a satellite tracking channel having a frequency loop tracking a carrier frequency of a satellite signal; determining a satellite signal noise floor value associated with the satellite tracking channel; generating a first indication of a spoofed signal based on the determined satellite signal noise floor value and a tracking channel signal noise threshold associated with the satellite tracking channel; determining a satellite tracking phase noise associated with the satellite tracking channel; generating a second indication of a spoofed signal based on the determined satellite tracking phase noise and a tracking channel phase noise threshold associated with the satellite tracking channel; and detecting reception of a spoofed signal on the satellite tracking channel based on the generated first indication of a spoofed signal and the generated second indication of the spoofed signal. In an embodiment, the contents comprise instructions executed by a processor of the signal processing system.

BRIEF DESCRIPTION OF THE SEVERAL VIEWS OF THE DRAWINGS

Embodiments of the present disclosure will now be described with reference to the annexed drawings, which are provided purely by way of non-limiting example and in which.

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

A navigation receiver operates by down converting to quasi baseband the input signal received from the satellites, which is typically transmitted at L band (1-2 GHz), using a local oscillator to step down the input frequency and allow a baseband digital management of the Satellite information.

Figure 1:
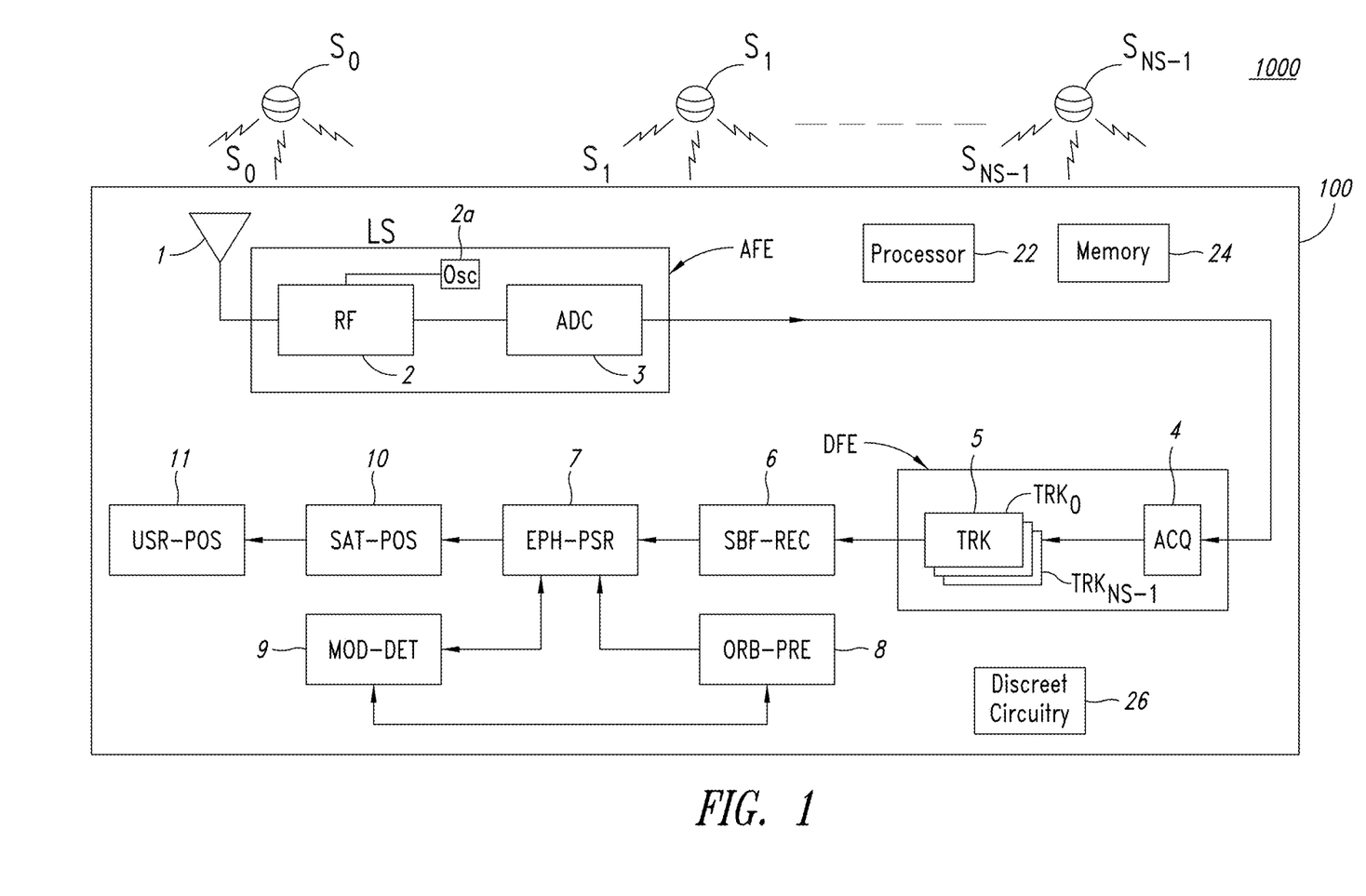
FIG. 1 is a schematic diagram showing a GNSS (Global Navigation Satellite System) system.

With reference to FIG. 1, which diagrammatically shows a GNSS Global Navigation Satellite System) system 1000 (such as, for example, Global Positioning System (GPS), Global'naya Navigatsionnaya Sputnikovaya Sistema (GLONASS), Galileo System, or other types of satellite-based positioning systems, such global satellite positioning system 1000 comprises a constellation of a number NS of satellites $S_0$-$S_{NS-1}$ and at least a receiving apparatus 100. The satellite signals used in the GNSS (Global Navigation Satellite System) are typically of the CDMA-type (Code Division Multiple Access). The satellite signals reception at the receiving apparatus 100 is typically implemented through the following, sequentially performed, standard steps: analog filtering, frequency conversion and digitization, acquisition, tracking, decoding and positioning.

The receiving apparatus 100 comprises an antenna 1, an analog receiving module AFE (Analog Front End), provided with a radiofrequency (RF) stage 2, and an analog-digital converter 3 (ADC), which can be implemented by hardware modules.

Further, the receiving apparatus 100 comprises a digital processing module DFE (Digital Front End), including an acquisition module 4 (ACQ), and a tracking module 5 (TRK).

Moreover, the receiving apparatus 100 is provided with a sub-frame recovery module (SBF-REC) 6, an ephemerides processing and pseudo-range calculation module 7 (EPH-PSR), a satellites orbits prediction module 8 (ORB-PRE), a satellite type detecting module 9 (MOD-DET), a satellite position calculation module 10 (SAT-POS), and a user position calculation module 11 (USR-POS).

In an example embodiment, acquisition module 4, tracking module 5 can be implemented by hardware (e.g., using discrete circuitry 26), while the remaining modules 6-11 can be implemented by software (e.g., software stored in the memory 24 and executed on the processor 22). In addition, it is observed that the acquisition module 4 and tracking module 5 can also be implemented by various combinations of hardware and software.

The receiving apparatus 100 is provided with a central processing unit 22, memories 24 (mass memory and/or working storage) and respective interfaces (not shown in figures), comprising a microprocessor or microcontroller, for running the software resident in it.

The following embodiments are described in a non-limiting way referring to the GPS technology, however the teachings of the present disclosure can be applied also to other satellite positioning systems.

When the receiving apparatus 100 operates, the antenna 1 receives a plurality of signals $S_0, \ldots, S_{NS-1}$ from one or more satellites $S_0$-$S_{NS-1}$ of the constellation of satellites operating in system 1000. For example, these signals can be modulated on a carrier having a frequency of about 1.5 GHz. Each received signal transports a pseudo-random code and a message for the data communication.

The pseudo-random code, known as CA code, for example at 1 MHz, is used for distinguishing a satellite from another, and enables the receiving apparatus 100 to measure the time instant at which has been transmitted a signal by a corresponding satellite. Pseudo-random code is implemented by a sequence of pulses, called chips.

The radio frequency stage 2 operates on the signals received by antenna 1 (of the analog type) and converts them to the base band or to an intermediate frequency. Analog-digital converter 3 converts the intermediate frequency signals to corresponding digital signals. The radio-frequency stage 2 operates the conversion at an intermediate frequency using the frequency of a local signal LS which may be supplied by a Temperature Compensated Crystal Oscillator (TCXO) 2a.

The acquisition block 4 identifies in the digital signals originated by the analog-digital converter 3 the satellites in visibility, testing their presence by trying to match their transmitted PRN (Pseudo Random Noise) code sequence, the CA code, with a corresponding local replica and when a peak confirmation is found it provides the initial GNSS information, code/frequency information to an elementary Intermediate Frequency tracking correlation block. Further, the acquisition module 4 detects a plurality of parameters associated to the satellites and used for time tracking the satellite.

The data navigation message transports data (for example at a bit rate equal to 50 Hz) and particularly is modulated based on the Binary Phase Shift Keying (BPSK) technique. Further, data navigation message is hierarchically divided in frames and sub-frames and transports several information, among them a plurality of parameters used for determining the orbit and consequently the position of satellites.

The tracking module 5 has plural tracking channels, indicated by a channel index i from 0 to NS−1, in particular indicated as $TRK_0 \ldots TRK_{NS-1}$ and each is allocated to a different satellite of the constellation. Specifically, the tracking module 5 is configured to operate as carrier tracking loop, which can be designed to follow either the phase of the incoming signal-using Phase Lock Loops (PLL), or the Doppler frequency of the incoming signal using Frequency Lock Loops (FLL). Phase noise, residual fluctuation of the tracking process, is intended as a quality metric and it is adopted to identify the goodness of the tracking itself at a given carrier to noise Cn0.

The tracking module 5 is configured to supply data to the sub-frame recovery module 6, as a time sequence of samples pairs, indicated with {I, Q}. Each sample {I, Q} is for example the result of a coherent integration, respectively in-step and quadrature, of a bit of 20 ms, performed by a correlator based on the modulation technique Binary Phase Shift Keying (BPSK), each samples pair {I, Q} represents a transmitted bit.

As it is known in the field of the digital communication theory, each sample {I, Q} can be further interpreted as a phasor, by considering the value I and value Q as the real and imaginary parts of a bi-dimensional vector in the complex Cartesian plane.

Moreover, for each satellite, in the tracking module 5 the Doppler frequency and the transfer time of the GPS signal transmitted by a satellite $S_0$-$S_{NS-1}$ are determined.

Figure 2:
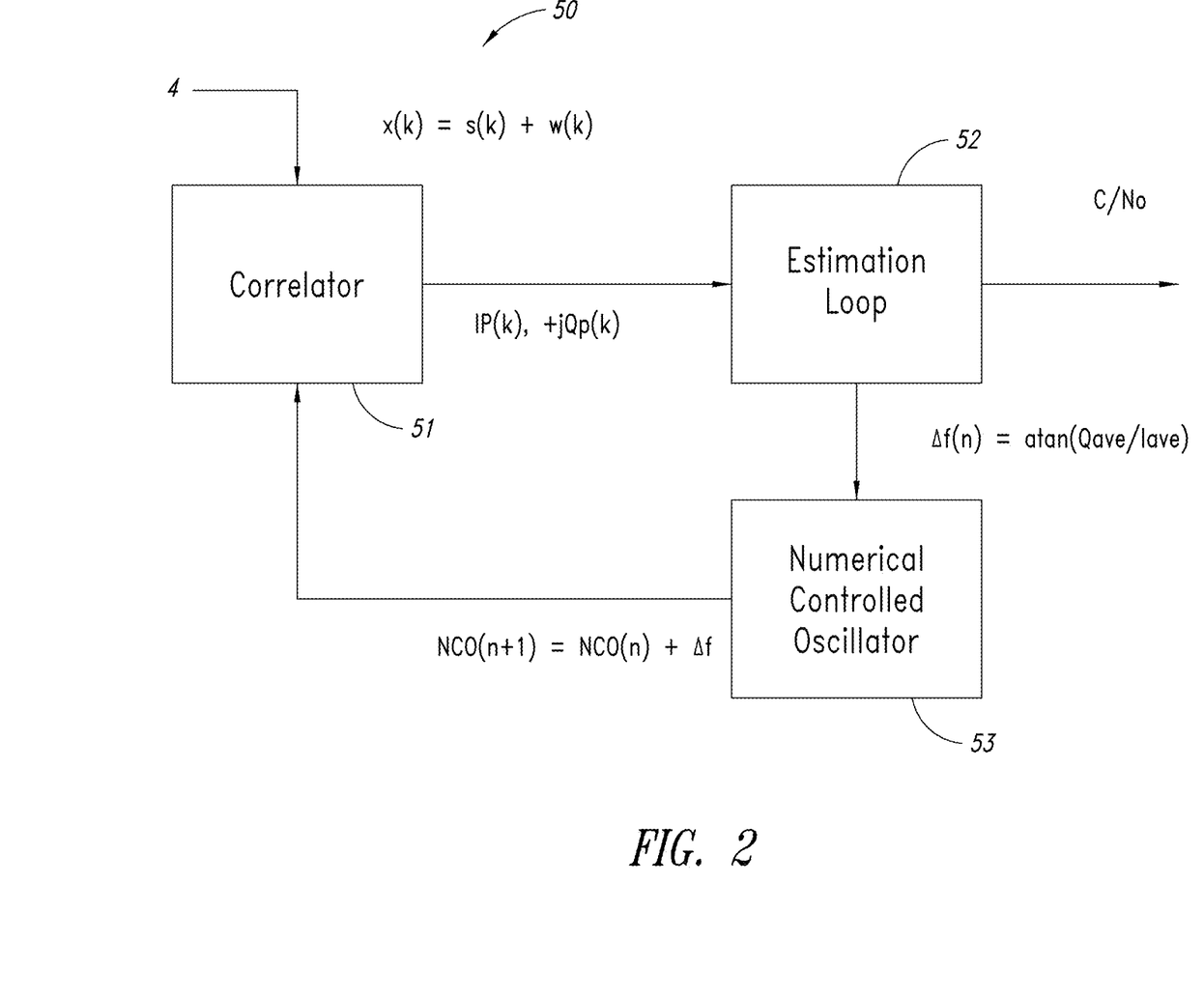
FIG. 2 is a schematic diagram of a tracking channel employed in the system of FIG. 1.

In FIG. 2 it is shown a block schematics of a tracking channel $TRK_i$ 50 pertaining to a generic i-th satellite $S_i$.

A hardware correlator circuit 51 receives the sampled received signal from block 4x(k) and supplies a correlated signal:

$x(k)=s(k)+w(k)=Ip(k)+jQp(k)$, for instance each millisecond, which is the period of index k of the sample of the correlated signal x(k), to a carrier/Cn0 estimation loop block or circuit 52, which outputs a frequency drift at iteration n, $\Delta f(n)=a\, tan(Qave/Iave)$ to a Numerical Controlled Oscillator hardware block or circuit, or NCO, 53. The signal component is s(k) and w(k) is the noise component of the correlation signal x(k), Ip, Qp are the in in-step, or in phase, and quadrature components of the correlation signal, Iave and Qave are the respective values averaged over one on more bits (the iteration index n updates for instance every 20 or 200 samples/milliseconds (interval of index k=1 ms)) to evaluate the residual frequency drift, Δf, and match the Doppler of the i-th satellite $S_i$ to strip out at the following correlation and optimize the peak tracking. The NCO 53 supplies a Fine Tuned Frequency Doppler reference NCO(n+1)=NCO(n)+Δf(n). Correlation is thus executed every millisecond, for the satellite $S_i$ being tracked, starting from the peak code phase position and using the Fine Tuned Frequency Doppler reference NCO(n) that is updated through the carrier loop 52 and the NCO 53.

The signal model for locked satellites can be written as $x(k)=s(k)+w(k)$ $s(k)=A\sqrt{\alpha_D}\cdot exp(j2\pi FT_c k+j\varphi_0)$ $w_{I,Q}(k)\sim N(0,\sigma)$ where σ is the noise floor (the standard deviation of one component) of both the I and Q noise components, assumed AWGN (Additive White Gaussian Noise). $\varphi_0$ is the initial phase. $\alpha_D$ is the energy attenuation due to the residual Doppler error (between programmed carrier NCO frequency F and the true SV Doppler). Tc is the chip duration and A the amplitude.

For what regard estimation of the carrier to noise ratio Cn0, which may be output by block 52 in FIG. 2, starting from in-step and quadrature samples, Ip and Qp, which are available every ms on Prompt signal, it is possible to accumulate the Wideband power Pw and Narrowband power $P_N$ (at 1 KHz and 50 Hz respectively), from which carrier to noise ratio Cn0 can be estimated.

Every bit (e.g., every 20 ms for GPS case) they write as $$P_W(k) = \sum_{n=1}^{20}\left(I_P(n)^2 + Q_P(n)^2\right)$$

$$P_N(k) = \left[\sum_{n=1}^{20}I_P(n)\right]^2 + \left[\sum_{n=1}^{20}Q_P(n)\right]^2 = I_{PS}(k)^2 + Q_{PS}(k)^2$$

The Wideband power Pw and Narrowband power $P_N$ are averaged over a number $N_{dc}$ of consecutive times/periods, typically 10, e.g., 10 times the bit length of 20 ms:

$$P_{WS} = \frac{1}{N_{dc}}\sum_{k=1}^{N_{dc}}P_W(k) \quad P_{NS} = \frac{1}{N_{dc}}\sum_{k=1}^{N_{dc}}P_N(k)$$

then they are filtered for stability $$P_{WS,FILT} \leftarrow [(N_{dc,CN0}-1)P_{WS,FILT}+P_{WS}]\frac{1}{N_{dc,CN0}}$$

$$P_{NS,FILTS} \leftarrow [(N_{dc,CN0}-1)P_{NS,FILT}+P_{NS}]\frac{1}{N_{dc,CN0}}$$

The filtered quantities $P_{WS,FILT}$, $P_{NS,FILT}$ are used to derive the carrier to noise ratio Cn0 for the locked channel to which the in-step and quadrature samples, Ip and Qp refer, with the following expression:

$$C/N_0 = \frac{N_b(P_{NS,FILTS}/P_{WS,FILT}-1)}{N_b\cdot 10^{-3}(N_b-P_{NS,FILTS}/P_{WS,FILT})} = \frac{R_b(P_{NS,FILTS}-P_{WS,FILT})}{P_{WS,FILT}-P_{NS,FILTS}/N_b}$$

The Cn0 formula denominator is called Satellite Noise floor N0 and is the Wideband Power decreased by the Narrowband power divided by the bit length Nb.

Its value, averaged among all the locked satellites, is called Channel Noise Floor ($\overline{N0}$).

The Satellite in phase $I_p$ and quadrature phase $Q_p$ correlation samples are also incoherently accumulated, starting from a valid bit edge phase, over the bit length to build corresponding accumulated quantities $Qsum20_k$ and $Isum20_k$, k being the index of the bit, that are then mixed between consecutive bits, e.g., k and k−1, to produce the quantities ($Imix_k$, $Qmix_k$) corresponding to the beat information that are used to detect a delta phase, or equivalently a frequency offset, with respect to the already tracked one, and update the frequency value at which the satellite is tracked.

Referring to GPS case, 20 ms bit length, without losing in generality, it possible to derive the rule for frequency update applying sequentially the equations reported below:

$$Imix_k = Isum20_k * Isum20_{k-1} + Qsum20_k * Qsum20_{k-1}$$

$$Qmix_k = Isum20_k * Qsum20_{k-1} + Qsum20_k * Isum20_{k-1}$$

$$\overline{\Delta\phi} = \frac{1}{L}\sum_{k=1}^{L} -A\tan2(Qmix_k, Imix_k)$$

$$\Delta f = \frac{\overline{\Delta\phi}}{2\pi Ts}, Ts = 0.02s$$

where L is the interval (e.g., 10 bits) at which the phase rate quantities, A tan 2 ($Qmix_k$, $Imix_k$) are averaged for decision.

The quality metric for the frequency loop is the Tracking phase noise Ph, that is the residual between the phase rate $\Delta\overline{\phi}$ got from measurement of the phase difference and its average [expected value]. It is expressed in millidegrees and in nominal conditions, at the steady state, it should stably go to zero to indicate a fully locked frequency tracking achieved.

Each i-th tracking channel $TRK_i$ includes thus, in a way known per se, a frequency locked loop and also a carrier to noise ratio meter, which estimates the carrier to noise ratio C/No, for instance every N (e.g., 10) accumulation periods of frequency loop of the tracking channel, where the elementary coherent one is bounded by the bit length of the signal being considered, e.g., of 20 ms for the GPS L1/CA case, and aligned to the 1st millisecond of the bit.

The sub-frame recovery module 6, by means of suitable algorithms, decodes the different received sub-frames forming the navigation data message. The ephemerides processing and pseudo-range calculation module 7 stores the satellite orbit, as ephemerides data, and calculates the existent distances between the satellites and the receiving apparatus 100: such distances are called pseudo-range. By these calculated values, and the time for transferring the GPS signal, the satellite position calculation module 10 calculates the positions of the satellites expressed by 3D coordinates, at the moment of transmission.

The satellite orbit prediction module 8 can be activated for assisting the ephemerides processing and pseudo-range calculation module 7 and/or satellite position calculation module 10 when the ephemerides data are not available at the receiving apparatus 100.

The satellite type detecting module 9 is configured to determine the type of the tracked satellite and by it the solar radiation pressure model to be used in the orbit prediction by the satellite orbit prediction module 8, according to modes that will be described in the following as examples. The satellite type detecting module 9 enables to determine the type of satellite in order to select the solar radiation pressure model which better provides for the shape, mass and size of a satellite.

In this embodiment, the satellite position calculation module 10 operates on the time for transferring the GPS signal together with the reception time (known due to a clock inside the receiving apparatus 100). The satellite position calculation module 10 operates in order to evaluate how much time is required to the signal from each satellite for reaching the receiving apparatus 100, evaluating in this way the distance from the corresponding satellite (pseudo-range).

By a triangulation algorithm, the user position calculation module 11 calculates the position of the receiving apparatus 100 based on the distances of the receiving apparatus 100, for example, from at least four satellites and based on the positions of the same satellites, known at this processing stage. In the following, the position of the receiving apparatus 100 (practically coinciding with the user position) will be called "fix."

As mentioned, the tracking module 5 includes a plurality of channels, tracking correlation blocks which are usually let working in parallel each tuned on a different satellite PRN code and frequency, among the ones previously identified by the acquisition block 4, with the goal to confirm or eventually discard the acquisition hypothesis for every of them. For the confirmed satellites, after a startup refinement of the code and frequency initially provided by the acquisition block, the stable locked tracking phase starts. It comprises tightly following both the frequency offset (velocity) and the code phase (distance) of the satellite vehicle being analyzed and to demodulate the position and time information embedded in its bit stream. This information is then provided to a Kalman Filter to triangulate the receiver position.

The tracking channel as mentioned includes a correlator which comprises a PRN (pseudorandom noise) delayed sequence generator. The GNSS signals received at the receiver includes a ranging code modulated into the carrier, also called Pseudo-Random Noise (PRN) code, which spreads the spectrum and allows retrieving ranging information. Therefore, the tracking channel includes a PRN delayed sequence generator, which generates PRN sequences which are early, punctual or delayed one with respect to the other to perform correlation with the ranging codes.

An embodiment here described in brief refers to a method for detecting spoofing in a GNSS (Global Navigation Satellite System) receiver which monitors received satellite signals, e.g., $S_0, \ldots, S_{NS-1}$ from one or more satellites $S_0$-$S_{NS-1}$, statistical properties and it compares them with expected one, in particular with determined threshold values. Thus, the solution here described identifies the spoofing attack at the time it starts monitoring the satellites signal statistical proprieties and comparing them with the expected ones.

The method comprises checking satellite signal statistical proprieties versus the expected ones, performing a joint check on quantities derived from such statistical properties to reveal the spoofing attack as soon as such quantities diverge at the same time from the expected ones.

In particular, the method comprises:
checking a Satellite Noise Floor value, the denominator N0 of a carrier to noise ratio $$\frac{C}{N0}$$

figure of merit for the i-th tracked satellite/signal $s_i$, $N0_i$, versus the average channel noise available on the communication channel $\overline{N0}$, by evaluating such average noise $\overline{N0}$ over all the tracked satellites $S_0$-$S_{NS-1}$ by a moving average filter when updating the carrier to noise ratio $$\frac{C}{N0}$$

for each satellite. In other words, the values of the denominators N0 of the carrier to noise ratio $$\frac{C}{N0}$$

figure of merit of each satellite signals, e.g., $s_0, \ldots, S_{NS-1}$, for instance over a given accumulation period are taken and the average value of such values of the denominators N0, $N0_0, \ldots, N0_{NS-1}$, is calculated. The moving average filter may be a filter performing a smoothing that converges to an average value among the denominators N0, $N0_0, \ldots, N0_{NS-1}$, that are in usual conditions anyway aligned;

checking a Tracking Phase Noise Ph against a figure of merit indicating good operation of the tracking channel for the carrier to noise ratio values of interest in the application, e.g., a phase noise threshold value, which may be different for different values of carrier to noise ratio $$\frac{C}{N0}.$$

A joint check is then applied on such quantities, Satellite Noise Floor value and Tracking Phase Noise Ph, in particular at a given carrier to noise ratio $$\frac{C}{N0}$$

to detect the spoofing attack as soon as they diverge at the same time from the expected ones.

The embodiment is based on the observation of the presence of both the genuine and spoofing signals in the received data at once when the spoofing attack takes place. At the time the attack takes place the satellite tracking loop moves to spoofing letting in the meantime genuine signal in the tracking noise bandwidth.

This causes the denominator, noise N0, part of the carrier to noise ration $$\frac{C}{N0}$$

formula to be increased by the numerator, carrier signal C, part of the genuine signal, which, because of the spoofing signals being tracked by the corresponding tracking channel, is present, but not tracked anymore by its tracking channel. Therefore, the genuine satellite signal is accounted as noise N0 in the formula when the spoofing attack starts, leading to an increase of noise N0.

Also, the frequency loop noise is affected by the unexpected presence of two carriers, the genuine satellite signal carrier and the spoofing signal carrier, and by the fact the frequency loop suddenly moves toward the spoofing frequency of the spoofing signal while the genuine signal is treated as unrecovered random fluctuation that increases frequency noise. In nominal conditions, e.g., without spoofing, a strong satellite signal does not exhibit a huge frequency noise as compared instead as it happened under a spoofing attack in the transition phase of the loop from the genuine signal to the spoofing signal.

With reference to the signal model of the received signal x(k) and to the equation of carrier to noise ratio CnO:

$$C/N_0 = \frac{N_b(P_{NS,FILTS}/P_{WS,FILT} - 1)}{N_b \cdot 10^{-3}(N_b - P_{NS,FILTS}/P_{WS,FILT})} = \frac{R_b(P_{NS,FILT} - P_{WS,FILT})}{P_{WS,FILT} - P_{NS,FILTS}/N_b}$$

Noise Floor and Satellite Noise in nominal conditions are aligned since the former is a filtered version of the latter.

Under a spoofing attack the signal model so far reported does not hold anymore because the spoofer overlaps to the genuine signal.

The received signal model can be update considering both at the same time:

$$x(k)=s(k)+g(k)+w$$

where the spoofed signal is s(k) and is $$s(k)=A1\sqrt{\alpha_D}\cdot\exp(j2\pi f1 T_c k+j\varphi_0)$$

while the genuine signal g(k) is $$g(k)=A2\sqrt{\alpha_D}\cdot\exp(j2\pi f2 T_c k+j\varphi_1)$$

while the noise is $$w_{I,Q}(k)\sim N(0,\sigma)$$

A1 and A2 are the amplitudes of the spoofed signal and genuine signal, f1 and f2 the respective frequencies.

The spoofing attack relies on sequential steps:
initial silent synchronization to genuine (A1<<A2, f1=f2). The spoofer is not acting yet though present;
power increase for catching the channel control (A2>>A1, f1=f2). There is a typical 6 dB (four time the amplitude) separation;
trajectory divergence by frequency to move the position away (A2>>A1 f1!=f2).

When the trajectory divergence is in place the tracking channel locks on a frequency f1!=f2 (genuine) but at least in the first seconds of the attack |f1-f2| is inside the grabbing range of cn0 formula (1 KHz for the wideband power).

An embodiment here described thus provides that in the receiver during a tracking procedure of a tracking channel are periodically performed the steps of the method for detecting spoofing in a GNSS (Global Navigation Satellite System) receiver here described which, in embodiments, may include:

receiving at least a satellite signal $s_i$,
acquiring said satellite signal $s_i$ as received signal,
receiving said received signal in at least one tracking channel $TRK_i$ comprising a frequency loop tracking a carrier frequency of the satellite signal $s_i$,
wherein the method includes, during said tracking,
obtaining a satellite noise floor N0 value as noise of the tracking channel $TRK_i$,
obtaining an average channel noise $\overline{N0}$ computed over all the satellite signals $S_0, \ldots, S_{NS-1}$ being tracked in the receiver 100,
obtaining a ratio R of the satellite noise floor N0 value to the average channel noise $\overline{N0}$,
comparing the ratio R to a ratio threshold $R_{th}$,
obtaining a satellite tracking phase noise Ph,
comparing the satellite tracking phase noise Ph to a phase noise threshold $Ph_{th}$;
if both said ratio R and satellite tracking phase noise Ph are above the respective thresholds $R_{th}$, $Ph_{th}$, signaling, for example by setting a detection flag SD, detection of a spoofed signal on such tracking channel $TRK_i$.

Periodically performing in the receiver during a tracking procedure of a tracking channel the steps of the method for detecting spoofing in a GNSS may in embodiments, for instance, comprise that the method steps are performed at the end of every N loops of tracking, in particular the carrier to noise ratio is updated, e.g., N=10×20 ms=200 ms is the period with which the steps of the method are performed.

The method here described has the relevant advantage that can be applied to every RF channel and signal type (both legacy L1 and L2 and L5). It offers so a complete "on all channels and paths" anti-spoofing parallel detection mechanism.

Figure 3:
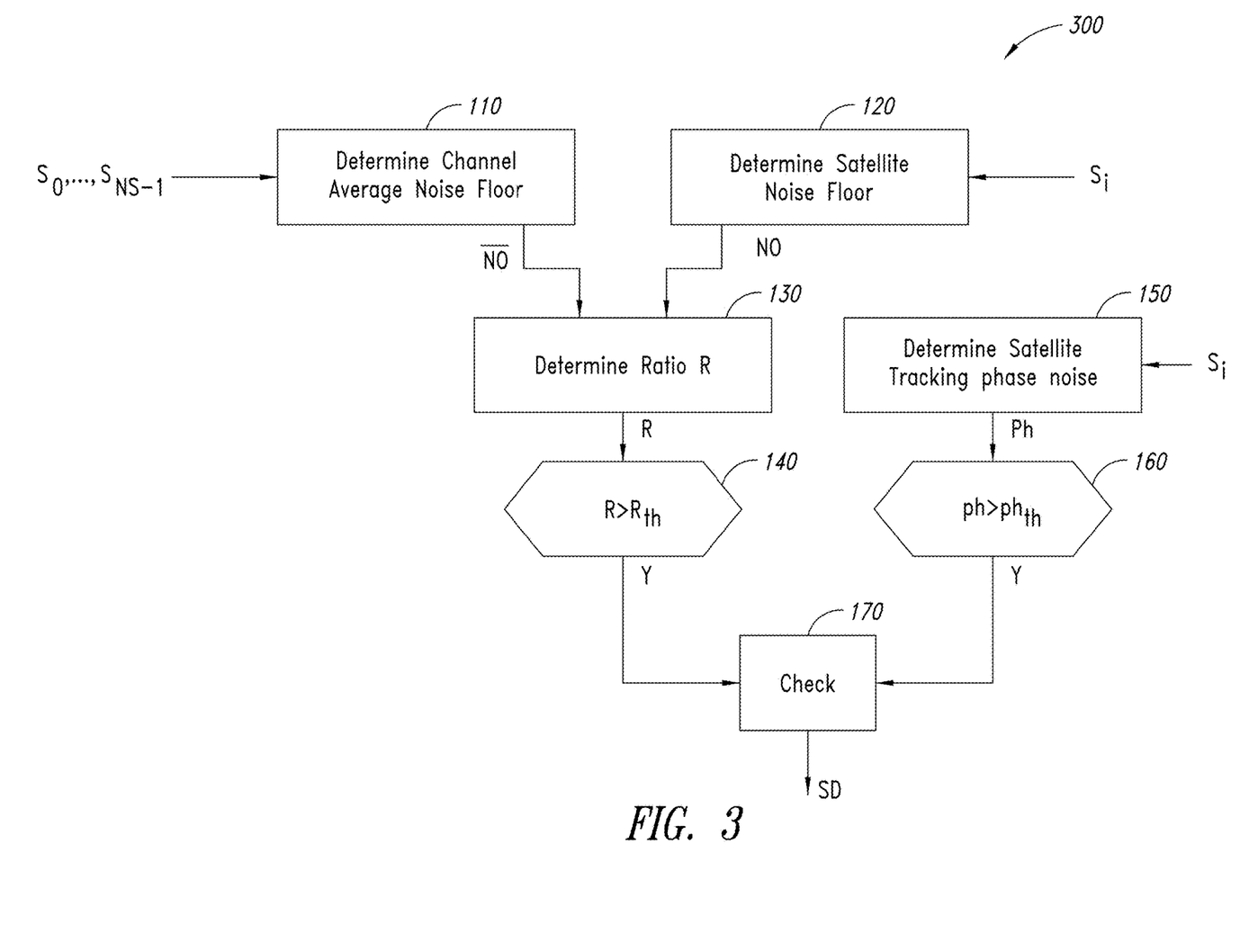
FIG. 3 is a flow diagram of a method according to an embodiment.

In FIG. 3 it is shown a flow diagram of an embodiment of a checking procedure 300 of the method here described which includes, in a step 110 getting the channel average noise floor $\overline{N0}$. The noise floor is the measure of the signal created from the sum of all the noise sources and unwanted signals within a measurement system, where noise is defined as any signal other than the one being monitored. The channel average noise floor N0 is a parameter evaluated among all the tracked satellites by a moving average filter when updating the carrier to noise ratio for every satellite.

In a step 120, which can be performed at the same time, before or after step 110, it is performed getting the Satellite Noise Floor N0, the denominator of the carrier to noise ratio C/NO measured in the tracking channel over a determined period.

In a step 130 a ratio R between Satellite Noise Floor N0 and channel average noise floor $\overline{N0}$ is computed, as R=N0/$\overline{N0}$. AS mentioned, as in a tracking channel $TRK_i$ the noise floor is any signal besides the signal which is being tracked by its frequency loop. In normal condition, the tracked signal is the i-th satellite signal $s_i$ being tracked, during an attack the tracked signal becomes the spoofing signal thus the satellite signal $s_i$ is computed in the Satellite Noise Floor N0. This thus, in case of attack determines an increase of the ratio R between Satellite Noise Floor N0 and channel average noise floor $\overline{N0}$.

In a step 140 therefore is checked if said ratio R is greater than a threshold ratio $R_{th}$, e.g., it is checked if the increase of the ratio R due to the increase of satellite noise floor N0 is above a level which, when passed, it is expected to correspond to the presence of a spoofing signal.

As mentioned, Satellite Noise Floor N0 and channel average noise floor $\overline{N0}$ are obtained for instance from the carrier to noise ratio meters available in every tracking channel, where the Satellite Noise Floor N0 is generic input to the average noise floor $\overline{N0}$, which for example is a filtered version of the Satellite Noise floor version, being such filtering performed by averaging the noise provided by all the satellite being tracked and not spoofed.

In a step 150 it is performed obtaining a satellite tracking phase noise Ph, which is measured at the frequency loop of the tracking channel $TRK_i$. This step can be performed at the same time, during, before or after steps 110-140.

In a step 160 is checked if such satellite tracking phase noise Ph is greater than a phase noise threshold $Ph_{th}$. As mentioned, the frequency loop noise is affected by the unexpected presence of the genuine satellite signal carrier $s_i$ and of the spoofing signal carrier, and by the sudden motion of the frequency loop toward the spoofing frequency of the spoofing signal. Without spoofing, a strong satellite signal does not exhibit a huge frequency noise as compared instead as it happened under a spoofing attack in the transition phase of the loop from the genuine signal to the spoofing signal, therefore the phase noise threshold $Ph_{th}$ is defined on the basis of the expected noise without spoofing in the tracking channel $TRK_i$.

In a step 170 is performed a joint checking of the measured quantities, it is checked if both the checks steps 140 and 160 are affirmative, if both said ratio R and satellite tracking phase noise Ph are above the respective thresholds $R_{th}$, $Ph_{th}$. In the affirmative a spoofing signal detection flag SD is raised, e.g., set to logic one from logic zero. Such spoofing signal detection flag SD is set and forwarded to a module which controls the upper integrity layer of the operation of the receiver, usually comprised in the receiver itself, for instance a SIS [Signal Integrity system layer] module or circuit. Such module is responsible to put the tracking channel $TRK_i$ which has been spoofed in quarantine and to raise a general spoofing alarm, in particular to quarantine such signals over a predefined time interval. The Quarantine list avoids using spoofed signals for positioning and prevents convergence to a wrong position.

The solution here described, as it operates in the Channel Frequency domain, can be easily integrated with other spoofing detection mechanism which operate on the code domain, with solution which monitor the correlation values of the correlators bank in the tracking channel.

Figure 4A:
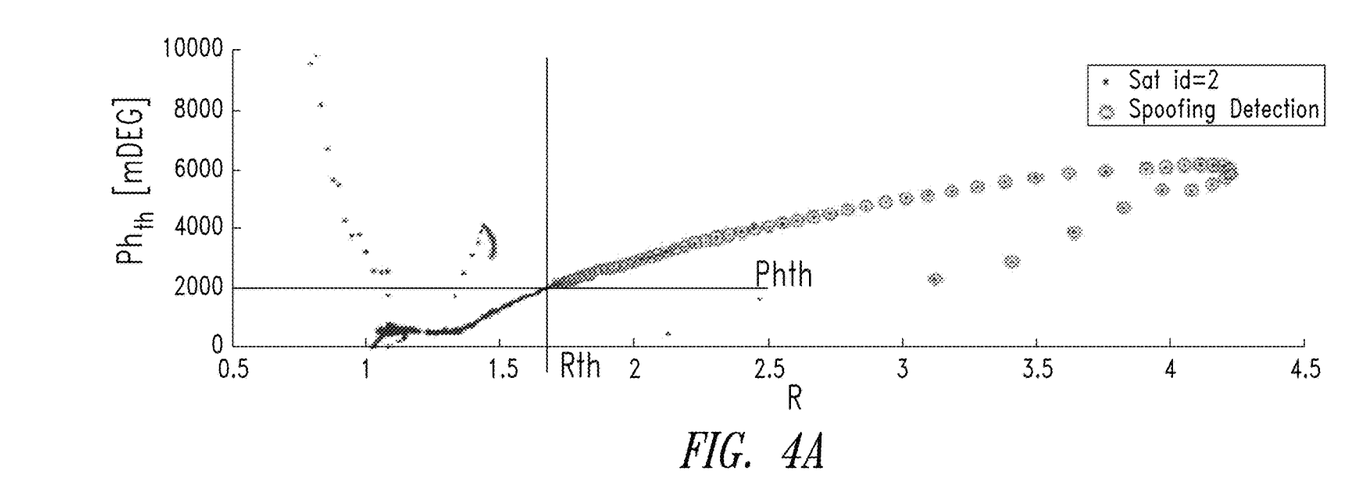
FIG. 4A-4C are diagram indicating the operation of an embodiment.
Figure 4B:
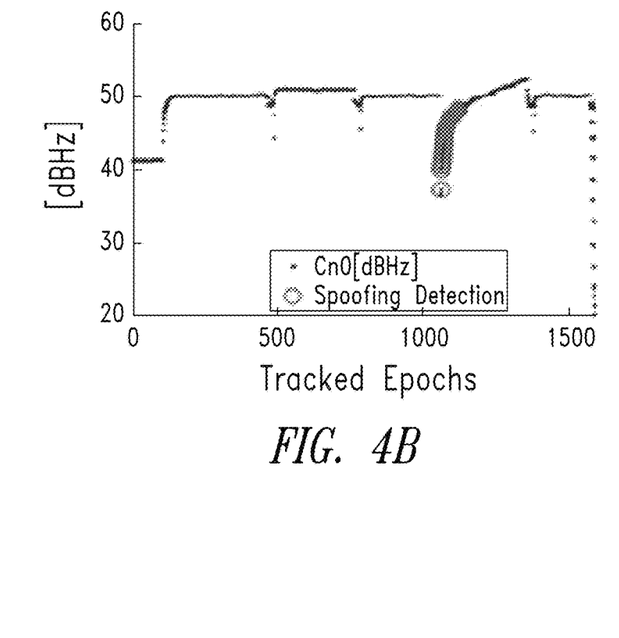
Figure 4C:
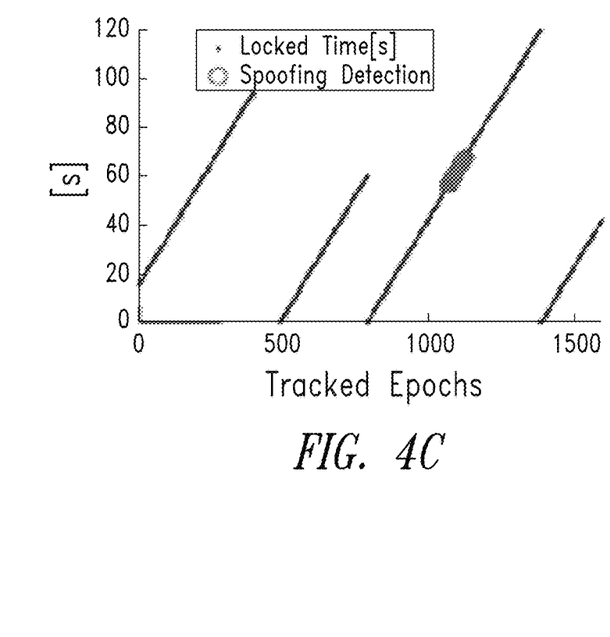

In FIGS. 4A-4C are shown diagrams representing results of test of the solution. In such diagrams a spoofing signal SS is applied on trajectory, applying a jump of 200 Hz of frequency, from the satellite signal frequency to the spoofing signal frequency, and 2 Km in position.

Code/frequency coordinates are artificially shifted, and satellite tracking loss and reacquisition is triggered.

In FIG. 4A it is shown the phase noise Ph on the vertical axis and the ratio R on the horizontal axis. Circles denote spoofing. As it can be seen, over a given value (thresholds $R_{th}$, $Ph_{th}$) on each axis joint detection of values indicates spoofing.

In FIG. 4B it is shown a temporal diagram, showing the carrier to noise ratio Cn0 as a function of a time quantity, tracked epochs, and in FIG. 4C it is shown the locked time in second, also as a function of a time quantity, tracked epochs. As it can be seen, circles denoting spoofing indicates the times at which satellite tracking loss and reacquisition is triggered.

The solutions disclosed herein have thus may have significant advantages with respect to the known solutions.

Advantageously the solution here described by the adoption of a procedure, implemented by software, that just relies on statistical divergence among the expected and spoofed quantities (Noise of signal C/NO and frequency loop) extends the spoofing detection capability to every RF channel (L1-L2-L5) without any limitation and allow matching customer expectation well beyond available countermeasures.

Of course, without prejudice to the principle of the disclosure, the details of construction and the embodiments may vary widely with respect to what has been described and illustrated herein purely by way of example, without thereby departing from the scope of the present disclosure, as defined by the ensuing claims.

The receiver apparatus may send the detection alert to a host processor of an autonomous driving system or of another navigation system exploiting such GNSS receiver apparatus.

In variant embodiments, instead of the average noise floor, average channel noise, $\overline{N0}$, obtained as an average value of noise floor values coming from other satellite tracking channels, a reference average noise $\overline{N0}$ may be used, evaluated inside the channel tracking $TRK_i$ itself using extra correlators that are let integrating for the chip length Tc and a different Doppler frequency (e.g., always at coordinates though extremely far away from the Doppler frequency of the genuine signal). Such correlation produces an autonomous "zero valued" carrier to noise ratio CnO (just noise) which denominator, which represents a Satellite Noise floor N0 value for that extra correlation, can be used as autonomous "clean reference" even under the attack and enabling the self-contained detection mode.

In an embodiment, a method for detecting spoofing in a GNSS receiver (100), may be summarized as including receiving at least a satellite signal ($s_i$), acquiring said satellite signal ($s_i$) as received signal, receiving said received signal in at least one tracking channel ($TRK_i$) including a frequency loop (51, 52, 53) tracking a carrier frequency of the satellite signal ($s_i$), wherein said method includes, during said tracking, obtaining (110) a satellite noise floor value (N0) as noise of the tracking channel ($TRK_i$), comparing said satellite noise floor value (N0) to a noise threshold ($N_{th}$) obtaining a satellite tracking Phase Noise (Ph) comparing the satellite tracking Phase Noise (Ph) to a phase noise threshold ($Ph_{th}$); if both said satellite noise floor value (N0) and satellite tracking Phase Noise (Ph) are above the respective thresholds ($N_{th}$, $Ph_{th}$), signaling (SD) detection of a spoofed signal on said tracking channel.

In an embodiment, the method comprises, during said tracking, obtaining (110) a satellite noise floor value (N0) as noise of the tracking channel ($TRK_i$), obtaining (120) a reference noise floor value, for example, an average channel noise ($\overline{N0}$) computed as average of noise floor values over all the satellite signals ($s_0, \ldots, s_{NS-1}$) being tracked; obtaining a ratio (R) of the satellite noise floor value (N0) to the reference noise floor value, for example, average channel noise ($\overline{N0}$); comparing said ratio (R) to a ratio threshold ($R_{th}$) obtaining a satellite tracking Phase Noise (Ph) comparing the satellite tracking Phase Noise (Ph) to a phase noise threshold ($Ph_{th}$); if both said ratio (R) and satellite tracking Phase Noise (Ph) are above the respective thresholds ($R_{th}$, $Ph_{th}$), signaling (SD) detection of a spoofed signal on said tracking channel.

In an embodiment, said reference noise floor value may be computed in the tracking channel ($TRK_i$) using correlators integrating over a chip length (Tc) and at a different Doppler frequency with respect to said frequency tracking loop.

In an embodiment, said signaling (SD) detection of a spoofed signal on said tracking channel may include setting a flag and forwarding said flag to a module which controls the upper integrity layer of the operation of the receiver, in particular to quarantine the spoofed signal over a predefined time interval.

In an embodiment, said module which controls the upper integrity layer of the operation of the receiver may send a detection alert to a host processor of an autonomous driving system or of another navigation system exploiting such GNSS receiver apparatus.

In an embodiment, a Receiver apparatus may be configured to perform an embodiment of the methods disclosed herein.

In an embodiment, a computer program product directly loadable into the internal memory of a digital computer, may be summarized as including software code portions for performing the steps of an embodiment of the methods disclosed herein.

In an embodiment, a method comprises: determining a satellite signal noise floor value associated with a satellite tracking channel, the satellite tracking channel having a frequency loop tracking a carrier frequency of a satellite signal; comparing the determined satellite signal noise floor value with a tracking channel signal noise threshold associated with the satellite tracking channel; determining a satellite tracking phase noise associated with the satellite tracking channel; comparing the determined satellite tracking phase noise with a tracking channel phase noise threshold associated with the satellite tracking channel; detecting reception of a spoofed signal on the satellite tracking channel based on the comparing of the determined satellite signal noise floor value with the tracking channel signal noise threshold and the comparing of the determined satellite tracking phase noise with the tracking channel phase noise threshold; and responding to the comparing of the determined satellite signal noise floor value with the tracking channel signal noise threshold indicating the determined satellite signal noise floor value exceeds the tracking channel signal noise threshold and the comparing of the determined satellite tracking phase noise with the tracking channel phase noise threshold indicating the determined satellite tracking phase noise exceeds the tracking channel phase noise threshold by generating a signal indicating a spoofed signal has been detected on the satellite tracking channel. In an embodiment, the comparing the determined satellite signal noise floor value with a tracking channel signal noise threshold associated with the satellite tracking channel comprises: determining a reference signal noise floor value; determining a ratio of the determined satellite signal noise floor value and the reference signal noise floor value; and comparing the determined ratio to the tracking channel signal noise threshold. In an embodiment, the reference signal noise floor value is an average channel noise over a plurality of satellite signals being tracked. In an embodiment, the reference signal noise floor value is computed in the tracking channel using correlators integrating over a chip length and at a different Doppler frequency with respect to said frequency tracking loop. In an embodiment, the generating the signal indicating a spoofed signal has been detected on the satellite tracking channel includes setting a flag and quarantining the spoofed signal over a defined time interval. In an embodiment, the generating the signal indicating a spoofed signal has been detected on the satellite tracking channel includes sending a detection alert to a host processor of an autonomous driving system or of another navigation system. In an embodiment, the satellite tracking channel is a tracking channel of a Global Navigation Satellite System (GNSS).

In an embodiment, a device comprises: a memory; and signal processing circuitry coupled to the memory. The signal processing circuitry, in operation: implements a satellite tracking channel having a frequency loop tracking a carrier frequency of a satellite signal; determines a satellite signal noise floor value associated with the satellite tracking channel; generates a first indication of a spoofed signal based on the determined satellite signal noise floor value and a tracking channel signal noise threshold associated with the satellite tracking channel; determines a satellite tracking phase noise associated with the satellite tracking channel; generates a second indication of a spoofed signal based on the determined satellite tracking phase noise and a tracking channel phase noise threshold associated with the satellite tracking channel; and detects reception of a spoofed signal on the satellite tracking channel based on the generated first indication of a spoofed signal and the generated second indication of the spoofed signal. In an embodiment, the signal processing circuitry, in operation, responds to the first indication of a spoofed signal indicating detection of a spoofed signal and the second indication of a spoofed signal indicating detection of a spoofed signal by generating a signal indicating a spoofed signal has been detected on the satellite tracking channel. In an embodiment, the signal processing circuitry, in operation, generates the first indication of a spoofed signal by: determining a reference signal noise floor value; determining a ratio of the determined satellite signal noise floor value and the reference signal noise floor value; and comparing the determined ratio to the tracking channel signal noise threshold. In an embodiment, the signal processing circuitry, in operation, determines the reference signal noise floor value by determining an average channel noise over a plurality of satellite signals being tracked. In an embodiment, the reference signal noise floor value is computed in the tracking channel using correlators integrating over a chip length and at a different Doppler frequency with respect to said frequency tracking loop. In an embodiment, the generating the signal indicating a spoofed signal has been detected on the satellite tracking channel includes setting a flag and quarantining the spoofed signal over a defined time interval. In an embodiment, the generating the signal indicating a spoofed signal has been detected on the satellite tracking channel includes sending a detection alert to a host processor of an autonomous driving system or of another navigation system. In an embodiment, the satellite tracking channel is a tracking channel of a Global Navigation Satellite System (GNSS).

In an embodiment, a system comprises: a host processor; and signal processing circuitry coupled to the host processor. The signal processing circuitry, in operation: implements a satellite tracking channel having a frequency loop tracking a carrier frequency of a satellite signal; determines a satellite signal noise floor value associated with the satellite tracking channel; generates a first indication of a spoofed signal based on the determined satellite signal noise floor value and a tracking channel signal noise threshold associated with the satellite tracking channel; determines a satellite tracking phase noise associated with the satellite tracking channel; generates a second indication of a spoofed signal based on the determined satellite tracking phase noise and a tracking channel phase noise threshold associated with the satellite tracking channel; and detects reception of a spoofed signal on the satellite tracking channel based on the generated first indication of a spoofed signal and the generated second indication of the spoofed signal. In an embodiment, the signal processing circuitry, in operation, responds to the first indication of a spoofed signal indicating detection of a spoofed signal and the second indication of a spoofed signal indicating detection of a spoofed signal by generating a signal indicating a spoofed signal has been detected on the satellite tracking channel. In an embodiment, the signal processing circuitry, in operation, generates the first indication of a spoofed signal by: determining a reference signal noise floor value; determining a ratio of the determined satellite signal noise floor value and the reference signal noise floor value; and comparing the determined ratio to the tracking channel signal noise threshold. In an embodiment, the signal processing circuitry, in operation, determines the reference signal noise floor value by determining an average channel noise over a plurality of satellite signals being tracked. In an embodiment, the signal processing circuitry, in operation, responds to detection of a spoofed signal by sending a detection alert to the host processor. In an embodiment, the host processor, in operation, implements a navigation system, and the signal processing circuitry, in operation, detects signals of a Global Navigation Satellite System (GNSS).

In an embodiment, a non-transitory computer-readable medium's contents cause a signal processing system to perform a method, the method comprising: implementing a satellite tracking channel having a frequency loop tracking a carrier frequency of a satellite signal; determining a satellite signal noise floor value associated with the satellite tracking channel; generating a first indication of a spoofed signal based on the determined satellite signal noise floor value and a tracking channel signal noise threshold associated with the satellite tracking channel; determining a satellite tracking phase noise associated with the satellite tracking channel; generating a second indication of a spoofed signal based on the determined satellite tracking phase noise and a tracking channel phase noise threshold associated with the satellite tracking channel; and detecting reception of a spoofed signal on the satellite tracking channel based on the generated first indication of a spoofed signal and the generated second indication of the spoofed signal. In an embodiment, the method comprises responding to the first indication of a spoofed signal indicating detection of a spoofed signal and the second indication of a spoofed signal indicating detection of a spoofed signal by generating a signal indicating a spoofed signal has been detected on the satellite tracking channel. In an embodiment, the contents comprise instructions executed by a processor of the signal processing system.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
  determining a satellite signal noise floor value associated with a satellite tracking channel, the satellite tracking channel having a frequency loop tracking a carrier frequency of a satellite signal;
  comparing the determined satellite signal noise floor value with a tracking channel signal noise threshold associated with the satellite tracking channel;
  determining a satellite tracking phase noise associated with the satellite tracking channel;
  comparing the determined satellite tracking phase noise with a tracking channel phase noise threshold associated with the satellite tracking channel;
  detecting reception of a spoofed signal on the satellite tracking channel based on the comparing of the determined satellite signal noise floor value with the tracking channel signal noise threshold and the comparing of the determined satellite tracking phase noise with the tracking channel phase noise threshold; and
  responding to the comparing of the determined satellite signal noise floor value with the tracking channel signal noise threshold indicating the determined satellite signal noise floor value exceeds the tracking channel signal noise threshold and the comparing of the determined satellite tracking phase noise with the tracking channel phase noise threshold indicating the determined satellite tracking phase noise exceeds the tracking channel phase noise threshold by generating a signal indicating a spoofed signal has been detected on the satellite tracking channel.

2. The method of claim 1, wherein the comparing the determined satellite signal noise floor value with a tracking channel signal noise threshold associated with the satellite tracking channel comprises:
  determining a reference signal noise floor value;
  determining a ratio of the determined satellite signal noise floor value and the reference signal noise floor value; and
  comparing the determined ratio to the tracking channel signal noise threshold.

3. The method of claim 2, wherein the reference signal noise floor value is an average channel noise over a plurality of satellite signals being tracked.

4. The method according to claim 3, wherein said reference signal noise floor value is computed in the tracking channel using correlators integrating over a chip length and at a different Doppler frequency with respect to said frequency tracking loop.

5. The method according to claim 1, wherein said generating the signal indicating a spoofed signal has been detected on the satellite tracking channel includes setting a flag and quarantining the spoofed signal over a defined time interval.

6. The method according to claim 5, wherein the generating the signal indicating a spoofed signal has been detected on the satellite tracking channel includes sending a detection alert to a host processor of an autonomous driving system or of another navigation system.

7. The method of claim 1, wherein the satellite tracking channel is a tracking channel of a Global Navigation Satellite System (GNSS).

8. A device, comprising:
  a memory; and
  signal processing circuitry coupled to the memory, wherein the signal processing circuitry, in operation:
    implements a satellite tracking channel having a frequency loop tracking a carrier frequency of a satellite signal;
    determines a satellite signal noise floor value associated with the satellite tracking
    generates a first indication of a spoofed signal based on the determined satellite signal noise floor value and a tracking channel signal noise threshold associated with the satellite tracking channel;
    determines a satellite tracking phase noise associated with the satellite tracking channel;
    generates a second indication of a spoofed signal based on the determined satellite tracking phase noise and a tracking channel phase noise threshold associated with the satellite tracking channel; and
    detects reception of a spoofed signal on the satellite tracking channel based on the generated first indication of a spoofed signal and the generated second indication of the spoofed signal.

9. The device of claim 8, wherein the signal processing circuitry, in operation, responds to the first indication of a spoofed signal indicating detection of a spoofed signal and the second indication of a spoofed signal indicating detection of a spoofed signal by generating a signal indicating a spoofed signal has been detected on the satellite tracking channel.

10. The device of claim 8, wherein the signal processing circuitry, in operation, generates the first indication of a spoofed signal by:
  determining a reference signal noise floor value;
  determining a ratio of the determined satellite signal noise floor value and the reference signal noise floor value; and
  comparing the determined ratio to the tracking channel signal noise threshold.

11. The device of claim 10, wherein the signal processing circuitry, in operation, determines the reference signal noise floor value by determining an average channel noise over a plurality of satellite signals being tracked.

12. The device according to claim 11, wherein said reference signal noise floor value is computed in the tracking channel using correlators integrating over a chip length and at a different Doppler frequency with respect to said frequency tracking loop.

13. The device according to claim 9, wherein the generating the signal indicating a spoofed signal has been detected on the satellite tracking channel includes setting a flag and quarantining the spoofed signal over a defined time interval.

14. The device according to claim 13, wherein the generating the signal indicating a spoofed signal has been detected on the satellite tracking channel includes sending a detection alert to a host processor of an autonomous driving system or of another navigation system.

15. The device of claim 8, wherein the satellite tracking channel is a tracking channel of a Global Navigation Satellite System (GNSS).

16. A system, comprising:
  a host processor; and
  signal processing circuitry coupled to the host processor, wherein the signal processing circuitry, in operation:
    implements a satellite tracking channel having a frequency loop tracking a carrier frequency of a satellite signal;
    determines a satellite signal noise floor value associated with the satellite tracking channel;
    generates a first indication of a spoofed signal based on the determined satellite signal noise floor value and a tracking channel signal noise threshold associated with the satellite tracking channel;
determines a satellite tracking phase noise associated with the satellite tracking
generates a second indication of a spoofed signal based on the determined satellite tracking phase noise and a tracking channel phase noise threshold associated with the satellite tracking channel; and
detects reception of a spoofed signal on the satellite tracking channel based on the generated first indication of a spoofed signal and the generated second indication of the spoofed signal.

17. The system of claim 16, wherein the signal processing circuitry, in operation, responds to the first indication of a spoofed signal indicating detection of a spoofed signal and the second indication of a spoofed signal indicating detection of a spoofed signal by generating a signal indicating a spoofed signal has been detected on the satellite tracking channel.

18. The system of claim 16, wherein the signal processing circuitry, in operation, generates the first indication of a spoofed signal by:
determining a reference signal noise floor value;
determining a ratio of the determined satellite signal noise floor value and the reference signal noise floor value; and
comparing the determined ratio to the tracking channel signal noise threshold.

19. The system of claim 18, wherein the signal processing circuitry, in operation, determines the reference signal noise floor value by determining an average channel noise over a plurality of satellite signals being tracked.

20. The system according to claim 16, wherein the signal processing circuitry, in operation, responds to detection of a spoofed signal by sending a detection alert to the host processor.

21. The system of claim 20 wherein the host processor, in operation, implements a navigation system, and the signal processing circuitry, in operation, detects signals of a Global Navigation Satellite System (GNSS).

22. A non-transitory computer-readable medium having contents which cause a signal processing system to perform a method, the method comprising:
implementing a satellite tracking channel having a frequency loop tracking a carrier frequency of a satellite signal;
determining a satellite signal noise floor value associated with the satellite tracking channel;
generating a first indication of a spoofed signal based on the determined satellite signal noise floor value and a tracking channel signal noise threshold associated with the satellite tracking channel;
determining a satellite tracking phase noise associated with the satellite tracking channel;
generating a second indication of a spoofed signal based on the determined satellite tracking phase noise and a tracking channel phase noise threshold associated with the satellite tracking channel; and
detecting reception of a spoofed signal on the satellite tracking channel based on the generated first indication of a spoofed signal and the generated second indication of the spoofed signal.

23. The non-transitory computer-readable medium of claim 22, wherein the method comprises responding to the first indication of a spoofed signal indicating detection of a spoofed signal and the second indication of a spoofed signal indicating detection of a spoofed signal by generating a signal indicating a spoofed signal has been detected on the satellite tracking channel.

24. The non-transitory computer-readable medium of claim 22, wherein the contents comprise instructions executed by a processor of the signal processing system.

* * * * *

UNITED STATES PATENT AND TRADEMARK OFFICE
CERTIFICATE OF CORRECTION

| | | |
|---|---|---|
| PATENT NO. | : 12,222,426 B2 | Page 1 of 1 |
| APPLICATION NO. | : 17/953869 | |
| DATED | : February 11, 2025 | |
| INVENTOR(S) | : Domenico Di Grazia et al. | |

It is certified that error appears in the above-identified patent and that said Letters Patent is hereby corrected as shown below:

In the Claims

<u>Column 18, Claim 8, Line 5:</u>
"the satellite tracking" should read: --the satellite tracking channel;--.

<u>Column 19, Claim 16, Line 4:</u>
"the satellite tracking" should read: --the satellite tracking channel;--.

Signed and Sealed this
Eighth Day of April, 2025

Coke Morgan Stewart
*Acting Director of the United States Patent and Trademark Office*